US012654512B2

(12) United States Patent
Heo et al.

(10) Patent No.: US 12,654,512 B2
(45) Date of Patent: Jun. 16, 2026

(54) METHOD FOR SEPARATE CONTROL OF HVAC FOR A VEHICLE

(71) Applicants: HYUNDAI MOTOR COMPANY, Seoul (KR); KIA CORPORATION, Seoul (KR)

(72) Inventors: Jae Won Heo, Seoul (KR); Jin Han Kim, Ansan-si (KR); Yong Chul Kim, Hwaseong-si (KR); Tae Han Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 244 days.

(21) Appl. No.: 18/540,025

(22) Filed: Dec. 14, 2023

(65) Prior Publication Data

US 2025/0074146 A1     Mar. 6, 2025

(30) Foreign Application Priority Data

Aug. 29, 2023     (KR) ........................ 10-2023-0113280

(51) Int. Cl.
*B60H 1/00*          (2006.01)
(52) U.S. Cl.
CPC ..... *B60H 1/00742* (2013.01); *B60H 1/00842* (2013.01)
(58) Field of Classification Search
CPC ............ B60H 1/00742; B60H 1/00842; B60H 1/00849; B60H 1/0073; B60H 1/00785; B60H 1/00807
See application file for complete search history.

(56) References Cited

U.S. PATENT DOCUMENTS

2005/0267646 A1* 12/2005 Ichishi ................... G05D 23/27
                                                165/204
2011/0114739 A1*  5/2011 Misumi ............. B60H 1/00742
                                                454/143
2012/0142264 A1*  6/2012 Sagou ................ B60H 1/00842
                                                454/75

(Continued)

FOREIGN PATENT DOCUMENTS

KR          20110131914 A     12/2011

OTHER PUBLICATIONS

Application of U.S. Appl. No. 18/139,158 submitted to the USPTO on Apr. 25, 2023; 44 pp.

*Primary Examiner* — Nelson J Nieves
(74) *Attorney, Agent, or Firm* — Lempia Summerfield Katz LLC

(57)          ABSTRACT

A method for separate control of heating, ventilation, or air conditioning (HVAC) for a vehicle includes: determining if a set condition is satisfied, such that separate HVAC control is possible, when HVAC is performed; detecting a passenger count, an HVAC thermal load, and a relative humidity; performing HVAC in a first mode for front seats when no passenger is detected in the front passenger seat at the detecting step; selectively performing HVAC in a second mode for the front seats by comparing the HVAC thermal load with a set load; and adjusting a mixing ratio between inside and outside air, set depending on the relative humidity, by selectively reducing or increasing a quantity of inside air and a quantity of outside air depending on the passenger count.

10 Claims, 3 Drawing Sheets

(56) References Cited

U.S. PATENT DOCUMENTS

| | | | | |
|---|---|---|---|---|
| 2012/0312520 | A1* | 12/2012 | Hoke | B60N 2/5628 |
| | | | | 219/217 |
| 2013/0052929 | A1* | 2/2013 | Eisenhour | B60H 1/00785 |
| | | | | 454/75 |
| 2013/0325259 | A1* | 12/2013 | Kwon | B60H 1/00842 |
| | | | | 701/36 |
| 2014/0027090 | A1* | 1/2014 | Morikawa | B60H 1/00021 |
| | | | | 165/47 |
| 2014/0034266 | A1* | 2/2014 | Tabei | B60H 1/00842 |
| | | | | 165/42 |
| 2017/0274737 | A1* | 9/2017 | Delaruelle | B60H 1/008 |
| 2017/0334263 | A1* | 11/2017 | Schumacher | B60H 1/00742 |
| 2019/0351731 | A1* | 11/2019 | Jeong | B60H 1/00028 |
| 2020/0223323 | A1* | 7/2020 | Fujino | B60H 1/00842 |
| 2023/0036016 | A1* | 2/2023 | Jovovic | B60H 1/2227 |
| 2023/0063435 | A1* | 3/2023 | Chewter | B60H 1/00742 |
| 2024/0116328 | A1* | 4/2024 | Heo | B60H 1/00742 |
| 2024/0174048 | A1* | 5/2024 | Fu | B60H 1/32 |
| 2024/0424862 | A1* | 12/2024 | Stout, II | B60H 1/00871 |
| 2024/0424863 | A1* | 12/2024 | Bechtel | B60H 1/00864 |

* cited by examiner

FIG. 2

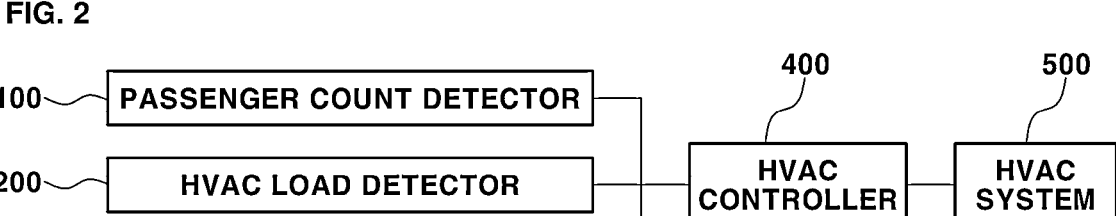

100 ～ PASSENGER COUNT DETECTOR

200 ～ HVAC LOAD DETECTOR

300 ～ RELATIVE HUMIDITY DETECTOR

400

HVAC CONTROLLER

500

HVAC SYSTEM

FIG. 3

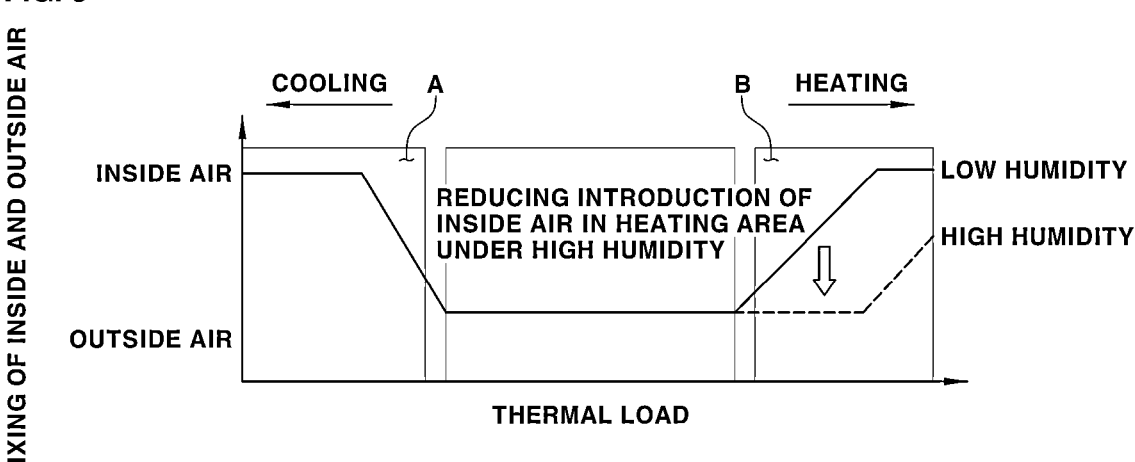

MIXING OF INSIDE AND OUTSIDE AIR

COOLING ← A                    B  HEATING →

INSIDE AIR                                          LOW HUMIDITY

REDUCING INTRODUCTION OF
INSIDE AIR IN HEATING AREA
UNDER HIGH HUMIDITY                HIGH HUMIDITY

OUTSIDE AIR

THERMAL LOAD

FIG. 4

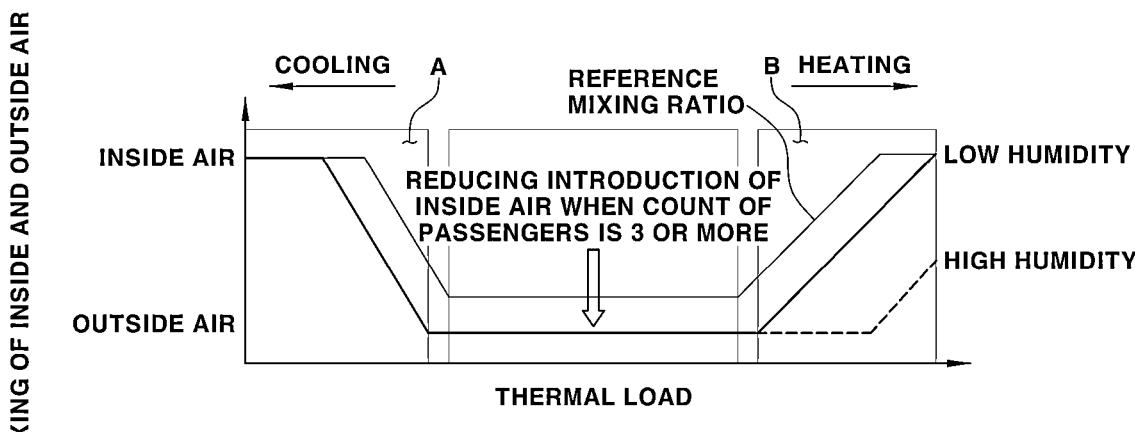

MIXING OF INSIDE AND OUTSIDE AIR

COOLING ← A        REFERENCE     B  HEATING →
                    MIXING RATIO

INSIDE AIR                                          LOW HUMIDITY

REDUCING INTRODUCTION OF
INSIDE AIR WHEN COUNT OF
PASSENGERS IS 3 OR MORE

OUTSIDE AIR                                        HIGH HUMIDITY

THERMAL LOAD

METHOD FOR SEPARATE CONTROL OF HVAC FOR A VEHICLE

CROSS-REFERENCE TO RELATED APPLICATION

This application claims, under 35 U.S.C. § 119 (a), the benefit of and priority to Korean Patent Application No. 10-2023-0113280, filed on Aug. 29, 2023, the entire contents of which are incorporated herein by reference.

BACKGROUND

(a) Technical Field

The present disclosure relates to a method for separate control of heating, ventilating, and air conditioning (HVAC) for a vehicle, and more particularly the method including detecting via seating detection whether a passenger is on board and focusing HVAC on or directed to the seat where the passenger is seated, thus reducing power consumption for heating and cooling.

(b) Background Art

Generally, a vehicle including an internal combustion engine that uses fossil fuel causes many problems. For example, such a vehicle produces exhaust gases, which cause air pollution, carbon dioxide, which causes global warming, and ozone, which causes respiratory diseases. Moreover, the quantity of fossil fuel on earth is limited and thus is in danger of being depleted.

For this reason, development of a pollution-free and eco-friendly electric vehicle (EV) that uses an electric motor as a driving source is ongoing.

An electric vehicle is equipped with an electric motor (a drive motor) to drive the vehicle and a battery to supply power to the electric motor. The electric vehicle is configured to travel after charging the battery.

As is well known, for an electric vehicle, the range (distance traveled on a single charge) is very important due to the limit of the energy storage density of the battery. Particularly when a heating, ventilation, and air conditioning (HVAC) system is in operation, an electric heater for heating, a compressor for cooling, an HVAC blower to move air and supply it to the vehicle interior for heating or cooling, and the like need to be driven, consuming a lot of power.

Here, due to consumption of battery power by the HVAC system, the maximum range may be reduced by up to 50% compared to the range when the HVAC system is not in operation.

Meanwhile, an electric vehicle does not have an engine as a heat source for heating, but instead has an electric heater that consumes battery power. Moreover, the electric vehicle does not have an engine as a driving source for the compressor but instead has an electric compressor that consumes battery power.

Therefore, in order to increase the range, reducing the electric load of the HVAC system is very important. For example, when the power consumption of the HVAC system is reduced by one third, the range may be increased by approximately 40% or more.

However, in a conventional electric vehicle, the temperature of the entire vehicle interior is adjusted regardless of the number of passengers in the vehicle, resulting in unnecessary HVAC power consumption.

The above information disclosed in this Background section is provided only to enhance understanding of the background of the present disclosure. Therefore, the Background section may contain information that does not form the related art that is already known to a person of ordinary skill in the art.

SUMMARY OF THE DISCLOSURE

The present disclosure has been made in an effort to solve the above-described problems associated with the related art. It is an object of the present disclosure to provide a method for separate control of heating, ventilation, or air conditioning (HVAC) for a vehicle. The method is performed such that whether a passenger on board is detected via seating detection and HVAC is performed focusing on the seat where a passenger is detected and seated. Accordingly, power consumption for heating and cooling may be reduced. The method may be performed such that an air discharge mode and a mixing ratio between inside and outside air are controlled depending on a passenger count, an HVAC thermal load, and a relative humidity, thereby continuously providing a pleasant environment for passengers.

In one aspect, the present disclosure provides a method for separate control of HVAC for a vehicle. The method includes determining if a set condition is satisfied, such that separate HVAC is possible, when HVAC is performed. The method also includes detecting a passenger count, an HVAC thermal load, and a relative humidity, when the set condition is satisfied. The method also includes performing HVAC in a first mode for front seats including a driver's seat and a front passenger seat, when a passenger is detected in a front passenger seat at the detecting step. The method also includes selectively performing HVAC in a second mode for the front seats, including the front passenger seat, by comparing the HVAC thermal load with a set load, when no passenger is detected in the front passenger seat at the detecting step. The method also includes adjusting a mixing ratio between inside and outside air, set depending on the relative humidity, by selectively reducing or increasing a quantity of inside air and a quantity of outside air depending on the passenger count when performing HVAC for the front seats in the first and second modes.

In an embodiment, the set condition may be a Def or a Defrost Mode OFF condition or a SYNC ON condition of an air discharge mode.

In another embodiment, the determining step may include performing entire interior HVAC when the set condition is not satisfied.

In still another embodiment, the first and second modes may include, when a passenger is detected in a back seat at the detecting step, performing entire interior HVAC.

In yet another embodiment, the first and second modes may include, when performing entire interior HVAC, selectively reducing or increasing the quantity of inside air and the quantity of outside air depending on the passenger count.

In still yet another embodiment, the first and second modes may include, based on a reference mixing ratio between inside and outside air set based on the passenger count being 'two', reducing the ratio of the inside air compared to the ratio of the inside air in the reference mixing ratio when the count of passengers is 'three' or more including a back seat passenger.

In a further embodiment, the reference mixing ratio may be set such that the quantity of inside air is gradually reduced or the quantity of outside air is gradually increased in a set cooling area or in a set heating area when a relative humidity in the heating area is equal to or less than a set humidity and introduction of the inside air in the heating area is reduced when the relative humidity in the heating area exceeds a set humidity and is determined to be a high humidity condition.

In another further embodiment, the first mode may include performing entire interior HVAC when HVAC for the front seats including the driver's seat and the front passenger seat does not satisfy the set condition.

In still another further embodiment, the second mode may include performing HVAC for the front seats, including the front passenger seat, when the HVAC thermal load in a set cooling area or in a set heating area is determined to exceed the set load, or may include performing HVAC only for the driver's seat when the HVAC thermal load is determined to be below the set load.

In yet another further embodiment, the step of adjusting the mixing ratio may include, based on a reference mixing ratio between inside and outside air set based on the passenger count being 'two', increasing the introduction ratio of the inside air compared to the ratio of the inside air in the reference mixing ratio when the passenger count is 'one'.

Other aspects and embodiments of the present disclosure are discussed below.

It should be understood that the terms "vehicle" or "vehicular" or other similar terms as used herein are inclusive of motor vehicles in general. Thus, these terms may encompass passenger automobiles including sport utility vehicles (SUV), buses, trucks, various commercial vehicles, watercraft including a variety of boats and ships, aircraft, and the like. These terms may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed below.

BRIEF DESCRIPTION OF THE DRAWINGS

The above and other features of the present disclosure are described in detail with reference to certain embodiments thereof illustrated in the accompanying drawings, which are given hereinbelow by way of illustration only, and thus do not limit the present disclosure, and wherein:

FIG. 2 is a view showing systems for separate HVAC control for a vehicle to explain a method for separate control of HVAC for a vehicle according to an embodiment of the present disclosure;

FIG. 3 is a graph showing a reference mixing ratio between inside and outside air used in performing a method for separate control of HVAC for a vehicle according to an embodiment of the present disclosure;

FIG. 4 is a graph showing a mixing ratio between inside and outside air when a passenger is detected in a back seat in performing a method for separate control of HVAC for a vehicle according to an embodiment of the present disclosure;

It should be understood that the appended drawings are not necessarily drawn to scale, presenting a somewhat simplified representation of various features illustrative of the basic principles of the present disclosure. The specific design features of the present disclosure, including, for example, specific dimensions, orientations, locations, and shapes, will be determined in part by the particular intended application and use environment.

In the figures, the reference numbers refer to the same or equivalent parts of the present disclosure throughout the several figures of the drawings.

DETAILED DESCRIPTION

Descriptions are provided in detail according to the embodiments disclosed herein, with reference to the accompanying drawings.

Advantages and features of the present disclosure, and a method of achieving the same, should be more apparent with reference to the embodiments described below in detail in conjunction with the accompanying drawings.

However, the present disclosure may be embodied in many different forms and should not be construed as being limited to the embodiments set forth herein. Rather, the embodiments are provided to make the present disclosure thorough and complete, and to fully convey the scope of the present disclosure to those of ordinary skill in the art. The present disclosure is defined only by the scope of the claims.

In describing the embodiments of the present disclosure, if a detailed explanation of a related known function or construction would unnecessarily obscure the gist of the present disclosure, such an explanation has been omitted but should be understood by those of ordinary skill in the art. When a component, device, element, or the like of the present disclosure is described as having a purpose or performing an operation, function, or the like, the component, device, or element should be considered herein as being "configured to" meet that purpose or perform that operation or function.

Figure 1:
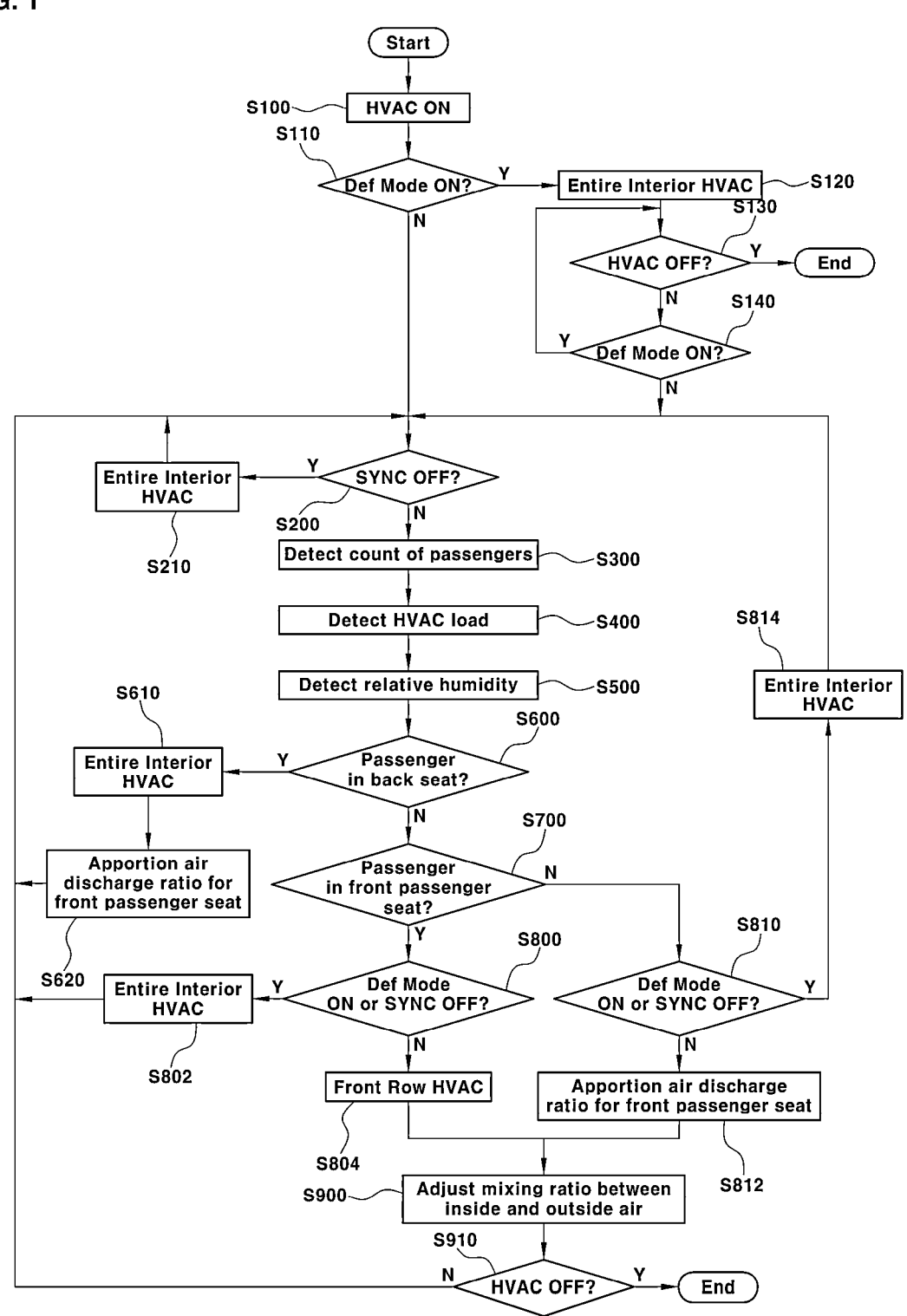
FIG. 1 is a flowchart of a method for separate control of heating, ventilation, or air conditioning (HVAC) for a vehicle according to an embodiment of the present disclosure.

FIG. 1 is a flowchart of a method for separate control of heating, ventilation, and air conditioning (HVAC) for a vehicle according to an embodiment of the present disclosure. FIG. 2 is a view showing separate HVAC control systems for a vehicle to explain a method for separate control of HVAC for a vehicle according to an embodiment of the present disclosure. FIG. 3 is a graph showing a reference mixing ratio between inside and outside air used in performing a method for separate control of HVAC for a vehicle according to an embodiment of the present disclosure.

Figure 5:
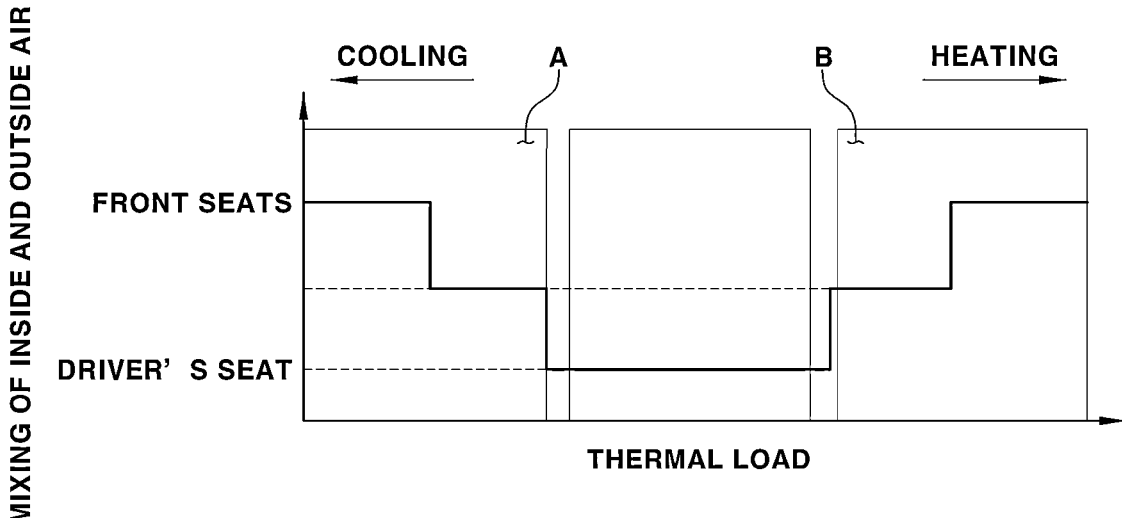
FIG. 5 is a graph showing an apportionment of air discharge at a front passenger seat during a second HVAC mode in performing a method for separate control of HVAC for a vehicle according to an embodiment of the present disclosure.
Figure 6:
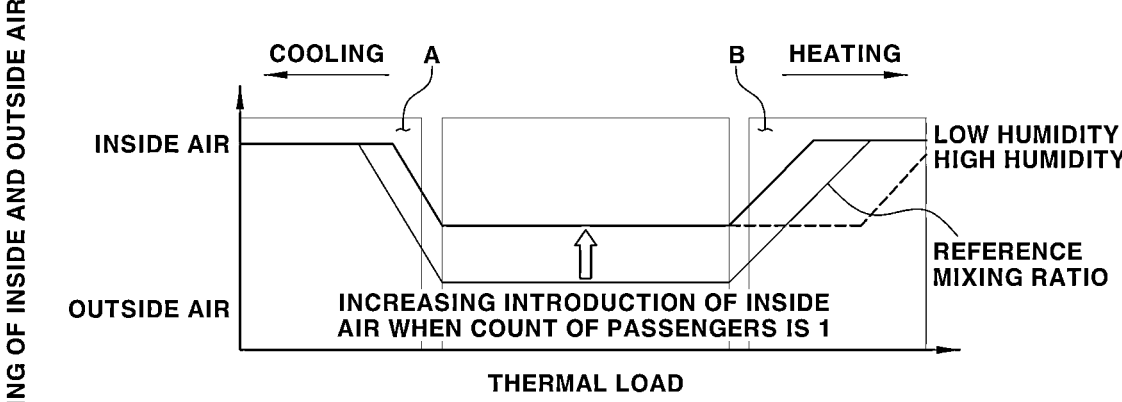
FIG. 6 is a graph showing a mixing ratio between inside and outside air when no passenger is detected in a front passenger seat in performing a method for separate control of HVAC for a vehicle according to an embodiment of the present disclosure.

FIG. 4 is a graph showing a mixing ratio between inside and outside air used when a passenger is detected in a back seat in performing a method for separate control of HVAC for a vehicle according to an embodiment of the present disclosure. FIG. 5 is a graph showing an apportionment or portion of air discharge at a front passenger seat during a second HVAC mode in performing a method for separate control of HVAC for a vehicle according to an embodiment of the present disclosure. FIG. 6 is a graph showing a mixing ratio between inside and outside air when no passenger is detected in a front passenger seat in performing a method for separate control of HVAC for a vehicle according to an embodiment of the present disclosure.

As shown in FIG. 1, a method for separate control of HVAC for a vehicle according to an embodiment is described sequentially as follows.

First, HVAC is performed at step S100. It is determined whether a set condition is satisfied at step S110 to check whether separate HVAC control is possible.

In other words, when an HVAC system 500 satisfies a set condition of a Defrost Mode OFF condition or a SYNC ON condition of an air discharge mode, at steps S110 and S200, it is determined by an HVAC controller 400 that separate HVAC control is possible.

On the other hand, at step S110, when it is determined that the air discharge mode is set to Defrost Mode ON for removing fogging or moisture from a window or windshield the HVAC controller 400 controls the HVAC system 500 to perform entire interior HVAC to remove fogging or moisture at step S120.

Thereafter, the HVAC controller 400 determines whether the HVAC system 500 is OFF at step S130. When the HVAC system 500 is ON, the HVAC controller 400 determines again whether the Defrost Mode is OFF at step S140 after entire interior HVAC is performed. The HVAC controller 400 then determines whether the SYNC On condition is satisfied at step S200.

Meanwhile, in the SYNC ON condition, i.e., when a separate HVAC button is ON at step S200, a passenger count is detected using a passenger count detector 100 at step S300, an HVAC thermal load is detected using an HVAC thermal load detector 200 at step S400, and a relative humidity is detected using a relative humidity detector 300 at step S500, as shown in FIG. 2.

On the other hand, in the SYNC OFF condition, i.e., when the separate HVAC button is OFF at step S200, which means that separate HVAC is impossible, the HVAC controller 400 controls the HVAC system 500 to perform entire interior HVAC at step S210.

Particularly, the passenger count detector 100 may detect the passenger count using the measurements detected from a plurality of sensors. More particularly, the passenger count detector 100 may detect the presence or absence of passengers and the passenger count based on the weight detected from a seat, based on whether a seat belt buckle is fastened, whether a door is opened, and the like.

The HVAC thermal load detector 200 may detect the HVAC thermal load based on an outside air temperature, a set temperature, an indoor temperature, solar radiation, and the like. The relative humidity detector 300 may detect the relative humidity via a relative humidity sensor.

Meanwhile, when the passenger count detector 100 detects a passenger in a back seat at step S600, the HVAC controller 400 controls the HVAC system 500 to perform entire interior HVAC so that HVAC is performed for the back seat at step S610.

When entire interior HVAC is performed at step S610, the ratio of inside air to outside air in the mixture of the inside and outside air is selectively reduced or increased depending on the passenger count at step S620.

In other words, as shown in FIG. 3, a reference mixing ratio between inside and outside air is set based on the passenger count being 'two', but when the count of passengers is 'three' or more, including the back seat passenger, the introduction ratio of the inside air is reduced compared to the ratio of the inside air in the reference mixing ratio, at step S620.

Here, in the reference mixing ratio, the amount of inside air is set to be gradually reduced in a cooling area A and the amount of outside air is set to be gradually increased in a heating area B as the HVAC thermal load increases (see FIG. 3). When the passenger count detector 100 detects that the passenger count is 'three' or more including the back seat passenger, the introduction ratio of the inside air is reduced compared to the ratio of the inside air in the reference mixing ratio as shown in FIG. 4.

Therefore, when entire interior HVAC is performed due to the presence of the back seat passenger, when a passenger is seated in a driver's seat or one of the second row seats, even including the back seat passenger, inside air and outside air are mixed according to the set reference mixing ratio as shown in FIG. 3. When the passenger count is 'three' or more, the introduction ratio of the inside air is reduced compared to the ratio of the inside air in the reference mixing ratio as shown in FIG. 4. Accordingly, the mixing ratio between inside and outside air is selectively adjusted depending on the count of passengers while performing entire interior HVAC, thereby continuously providing a pleasant environment for all passengers.

Here, for reference, the reference mixing ratio may be set such that the quantity of inside air is gradually reduced or the quantity of outside air is gradually increased in the set cooling area A or in the set heating area B. However, as indicated by the dotted line in FIG. 3, when the relative humidity detector 300 detects that the relative humidity exceeds a set humidity and a high humidity condition exists while heating is performed, the HVAC controller 400 may control the HVAC system 500 to reduce the introduction of the inside air in the heating area B. Also, when the passenger count is 'one' or 'three' or more, the HVAC system 500 reduces the introduction of the inside air in the heating area B based on the relative humidity (see dotted lines in FIGS. 4 and 6).

Meanwhile, when the passenger count detector 100 detects no passenger in the back seat at step S600 and detects a passenger in the front passenger seat at step S700, whether the set condition is satisfied, i.e., whether the Defrost Mode OFF condition or the SYNC ON condition is satisfied is determined at step S800, and HVAC is performed for the front seats including the driver's seat and the front passenger seat at step S804. When the set condition is not satisfied, entire interior HVAC is performed at step S802.

Here, in performing the HVAC for the front seats at step S804, the HVAC for the front seats is performed according to the reference mixing ratio, i.e., the mixing ratio between inside and outside air, adjusted at step S900 such that the quantity of inside air is gradually reduced in the cooling area A, which is set based on the count of passengers being 2, and the quantity of outside air is gradually increased in the heating area B as shown in FIG. 3.

On the other hand, when the passenger count detector 100 does not detect a passenger in the back seat at step S600 and does not detect a passenger in the front passenger seat at step S700 and the Defrost Mode OFF condition or the SYNC ON condition is satisfied at step S810, the HVAC controller 400 compares the HVAC thermal load detected by the HVAC thermal load detector 200 with the set load to selectively perform HVAC for the front seats including the front passenger seat at step S812. However, when neither the Defrost Mode OFF condition nor the SYNC ON condition are satisfied at step S810, entire interior HVAC is performed at step S814.

In other words, even though there is no passenger in the front passenger seat, discharging air from the front passenger seat in the cooling area A and in the heating area B depending on the detected HVAC thermal load may provide a pleasant environment for the driver. Therefore, as shown in FIG. 5, air may be discharged not only to the driver's seat but to all the front seats including the front passenger seat in the cooling area A and in the heating area B depending on the HVAC thermal load.

In other words, in the cooling area A or in the heating area B, when the HVAC thermal load is determined to exceed the set load and to be a relatively high thermal load condition, HVAC for all the front seat including the front passenger seat is performed. When the HVAC thermal load is determined to be below the set load, i.e., a relatively low thermal load condition, HVAC may be performed only for the driver's seat (see FIG. 5).

Here, in performing HVAC for all the front seats including the front passenger seat in accordance with any of the embodiments described herein, HVAC may be gradually performed for all the front seats including the driver's seat and the front passenger seat depending on the HVAC thermal load as shown in FIG. 5. HVAC may also be gradually performed for all the front seats including the driver's seat and the front passenger seat depending on the HVAC thermal load in other embodiments.

Therefore, according to an embodiment, even when there is no passenger in the front passenger seat, HVAC is selectively performed for the driver's seat or for all the front seats, i.e., the entire front seating area depending on the HVAC thermal load. This can aid in improving fuel efficiency and increasing the range of the vehicle, while continuously providing a pleasant environment for passengers.

Here, when the passenger count is 'one', i.e., when a passenger is seated in the driver's seat, the HVAC controller 400, as shown in FIG. 6, increases the introduction ratio of the inside air compared to the ratio of the inside air in the reference mixing ratio at step S900 based on the reference mixing ratio set according to the passenger count being 'two' (see FIG. 3). Accordingly, the introduction ratio of the inside air is increased due to one person on board, thereby continuously providing a pleasant environment for the passenger.

Finally, when the HVAC controller 400 controls the HVAC system 500 to be OFF or the vehicle stops operating, HVAC is OFF at step S910, ending the separate HVAC performed for the passengers on board.

As should be apparent from the above description, the present disclosure provides the following effects.

According to the present disclosure, whether a passenger is on board is detected via seating detection and HVAC is performed focusing or based on the seat where the passenger is seated. Accordingly, power consumption for heating and cooling may be reduced, thereby improving fuel efficiency and increasing the range of the vehicle.

Moreover, according to the present disclosure, an air discharge mode and a mixing ratio between inside and outside air are controlled depending on a passenger count, an HVAC thermal load, and a relative humidity, thereby continuously providing a pleasant environment for passengers.

Embodiments of the present disclosure have been described above with reference to the accompanying drawings. However, those of ordinary skill in the art to which the present disclosure pertains should understand that various modifications may be made to the above described embodiments, and that all or part of the above-described embodiment(s) may be selectively combined. Therefore, the true scope of protection of the present disclosure should be determined by the technical ideas included in the appended claims.

What is claimed is:

1. A method for separate control of heating, ventilating, or air conditioning (HVAC) for a vehicle, the method comprising steps of:
   determining if a set condition is satisfied, such that separate HVAC control is possible, when HVAC is performed;
   detecting a passenger count, an HVAC thermal load, and a relative humidity;
   performing HVAC in a first mode for front seats including a driver's seat and a front passenger seat, when a passenger is detected in a front passenger seat at the detecting step;
   selectively performing HVAC in a second mode for the front seats, including the front passenger seat, by comparing the HVAC thermal load with a set load when no passenger is detected in the front passenger seat at the detecting step; and
   adjusting a mixing ratio between inside and outside air, set depending on the relative humidity, by selectively reducing or increasing a quantity of inside air and a quantity of outside air depending on the passenger count when performing HVAC for the front seats in the first and second modes,
   wherein adjusting the mixing ratio between inside and outside air when performing HVAC for the front seats in the first and second modes includes adjusting the mixing ratio between inside and outside air based on a reference mixing ratio set based on the passenger count being two.

2. The method of claim 1, wherein the set condition is a Defrost Mode OFF condition or a SYNC ON condition of an air discharge mode.

3. The method of claim 1, wherein the determining step comprises performing entire interior HVAC when the set condition is not satisfied.

4. The method of claim 1, wherein the first and second modes include, when a passenger is detected in a back seat at the detecting step, performing entire interior HVAC.

5. The method of claim 4, wherein the first and second modes include, when performing entire interior HVAC, selectively reducing or increasing the quantity of inside air and the quantity of outside air depending on the passenger count.

6. The method of claim 5, wherein the first and second modes include reducing a ratio of the inside air compared to a ratio of the inside air in the reference mixing ratio when the passenger count is three or more including a back seat passenger.

7. The method of claim 6, wherein the reference mixing ratio is set such that the quantity of inside air is gradually reduced or the quantity of outside air is gradually increased in a set cooling area or in a set heating area when a relative humidity in the heating area is equal to or less than a set humidity and introduction of the inside air in the heating area is reduced when the relative humidity in the heating area exceeds a set.

8. The method of claim 1, wherein the first mode includes performing entire interior HVAC when HVAC for the front seats, including the driver's seat and the front passenger seat, does not satisfy the set condition.

9. The method of claim 1, wherein the second mode includes performing HVAC for the front seats, including the front passenger seat, when the HVAC thermal load in a set cooling area or in a set heating area is determined to exceed the set load, or includes performing HVAC only for the driver's seat when the HVAC thermal load is determined to be below the set load.

10. The method of claim 9, wherein the step of adjusting the mixing ratio includes increasing an introduction ratio of the inside air compared to a ratio of the inside air in the reference mixing ratio when the passenger count is one.

\*  \*  \*  \*  \*